United States Patent [19]
Frye

[11] 3,794,357
[45] Feb. 26, 1974

[54] HITCH DEVICE

[76] Inventor: Howard S. Frye, R.D. No. 1, Ligonier, Pa. 15658

[22] Filed: May 3, 1972

[21] Appl. No.: 249,797

[52] U.S. Cl. ................................. 280/515, 280/507
[51] Int. Cl. ............................................. B60d 1/06
[58] Field of Search ................... 280/507, 515, 457

[56] References Cited
UNITED STATES PATENTS

| | | | |
|---|---|---|---|
| 2,697,618 | 12/1954 | Hulstedt.......................... | 280/515 R |
| 2,654,613 | 10/1953 | Blair et al. ...................... | 280/515 R |
| 2,705,157 | 3/1955 | Dail................................. | 280/515 R |
| 2,794,657 | 6/1957 | Anderson........................ | 280/515 R |

*Primary Examiner*—David Schonberg
*Assistant Examiner*—Randall A. Schrecengost
*Attorney, Agent, or Firm*—Melvin A. Crosby

[57] ABSTRACT

A hitch device for connecting an implement or a wagon or the like to the draw bar of a draft implement such as a tractor in which the hitch device comprises upper and lower plates connected to the drawn device and adapted to receive the draw bar therebetween and having apertures to receive a pin or bolt which also passes through an aperture in the draw bar. A lock bar is pivotally mounted on the upper plate and has a first latched position where it overlies the pin and prevents disengagement thereof from the apertures and a second position wherein the bar exposes the apertures for insertion and removal of the pin.

5 Claims, 6 Drawing Figures

PATENTED FEB 26 1974  3,794,357
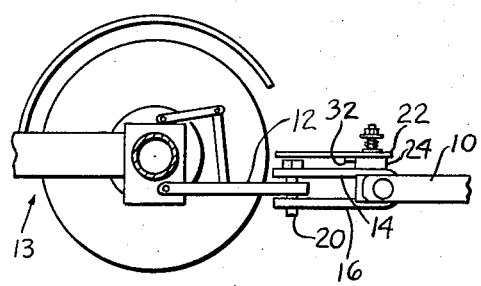
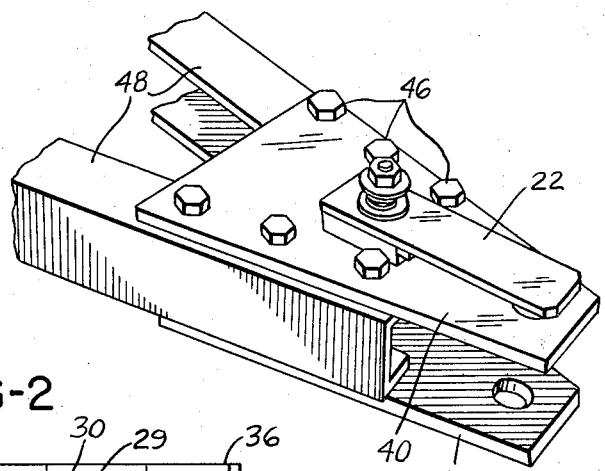
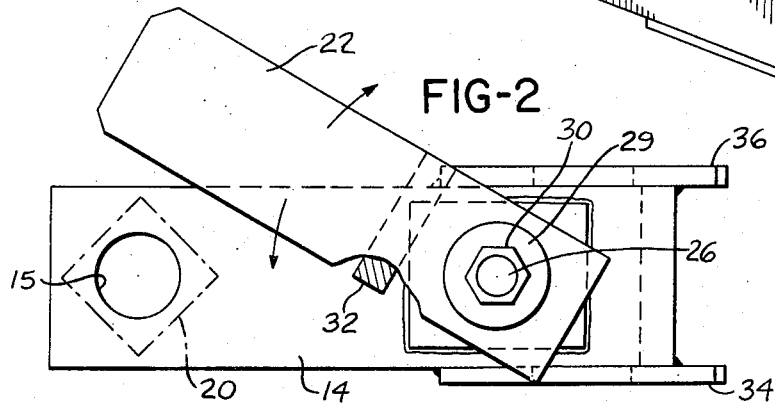
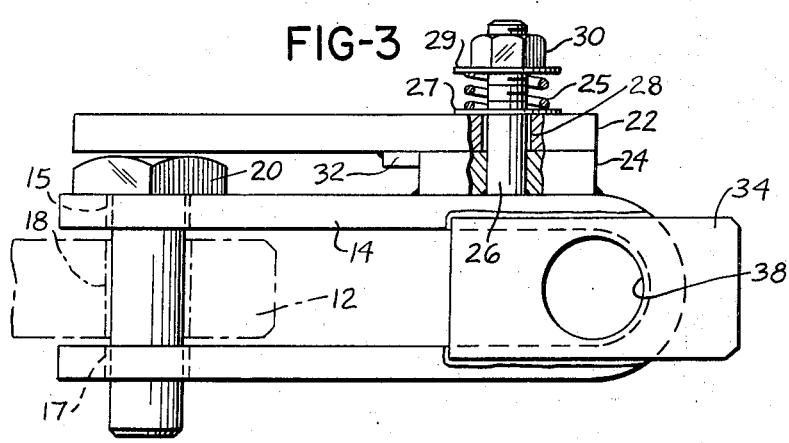
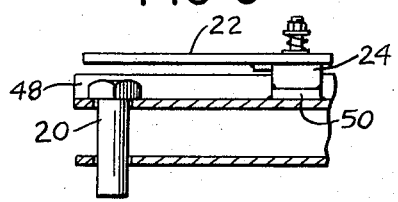
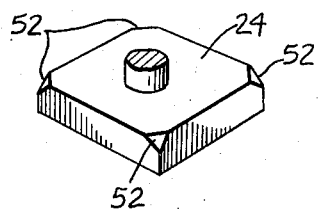

HITCH DEVICE

The present invention relates to hitch devices, and is particularly concerned with a hitch device which is prevented from becoming accidentally disengaged.

Hitch devices are widely used in connection with farm equipment, for example, wherein a hitch device connects an implement or wagon or the like to a draft vehicle draw bar, such as the draw bar of a tractor. Such hitch devices quite often employ a bolt or headed pin which is dropped through apertures in the hitch device from above and which also passes through an aperture in the draw bar of the draft vehicle thus effectively coupling the tractor to the drawn device.

Advantageously, the headed pins, or bolts, are merely dropped loosely through the apertures in the hitch device, and this introduces the possibility that the pins or bolts will work upwardly in use or will bounce out of the hitch device and disconnect the tractor from the implement or wagon to which it is connected.

It is, of course, possible to utilize cotter keys, or nuts, or other retaining devices, to retain the pin or bolt in position in the hitch device, but such hitch devices often become covered with mud and the like and must often be manipulated with gloves due to weather conditions and it is an inconvenience to disconnect latching devices from the pin or bolt. Furthermore, cotter keys and other safety devices of the nature referred to can easily break or become lost.

With the foregoing in mind, a primary objective of the present invention is the provision of a safety or locking device for a hitch of the nature referred to which will positively prevent the connecting pin or bolt from working out of the hitch device or from bouncing out of the hitch device.

Another object of the present invention is the provision of a safety or locking arrangement for a hitch device that utilizes a loose pin which can easily be manipulated even when wearing gloves.

A still further object of the invention is the provision of a locking or safety arrangement for preventing a pin from bouncing out of a hitch device which can be connected to substantially any hitch arrangement utilizing a loose pin.

It is also an object to provide a hitch device having a safety bar of the nature referred to in which the safety bar latches in effective and ineffective positions.

These and other objects and advantages of the present invention will become more apparent upon reference to the following detailed specification taken in connection with the accompanying drawings in which:

FIG. 1 is a schematic view showing the draw bar of a tractor connected to an implement draw bar by a hitch having a safety device according to the present invention.

FIG. 2 is a plan bar looking down on top of the hitch device and partly broken away to show details thereof.

FIG. 3 is a side elevational view of the device of FIG. 2 also partly broken away to show details thereof.

FIG. 4 is a perspective view showing a modified arrangement of the hitch device.

FIG. 5 is a side view partly in section showing another modification of the hitch device.

FIG. 6 is a perspective view showing a still further modification.

BRIEF SUMMARY OF THE INVENTION

According to the present invention, a hitch device is provided consisting of upper and lower plates fixedly interconnected in vertically spaced relation and adapted for receiving therebetween the draw bar of a draft vehicle such as a tractor. The draw bar and the plates are provided with apertures through which a pin can be inserted from above the top plate, the pin having a head thereon which rests on the top plate.

A conventional bolt is suitable for this purpose, but an unthreaded pin having a head thereon is equally satisfactory. According to the present invention, a bar is pivotally mounted on the upper plate and can be swung to a first latched position where it overlies the apertures in which the pin is disposed thereby preventing the pin from accidentally coming out of the apertures and disconnecting the tractor from the implement.

The bar can easily be grasped, even with a glove on the hand, and rotated into position to expose the apertures for the insertion or removal of the pin and the bar can, furthermore, be rotated to an ineffective latched position.

DETAILED DESCRIPTION OF THE INVENTION

Referring to the drawings somewhat more in detail, in FIG. 1, 10 is the forward end of an implement hitch structure and 12 designates the draw bar extending rearwardly from a tractor 13.

The device of the present invention consists of a pair of vertically spaced plates adapted to receive draw bar 12 therebetween. These plates consist of an upper plate 14 and a lower plate 16 which are rigidly interconnected. In the modification of FIGS. 1 to 3, plates 14 and 16 are the opposite ends of a single plate bent to a U shaped configuration. The plates 14 and 16 have registering apertures 15 and 17, respectively, and draw bar 12 has an aperture 18, and these apertures are adapted for receiving a headed bolt or pin 20 which is dropped into the apertures from above.

According to the present invention, pin or bolt 20 is prevented from becoming accidentally dislodged from the apertures by a bar 22 mounted on the upper one of the hitch bars 14 and adapted for being swung laterally between a position where it overlies the pin and apertures to a position where it exposes the apertures for insertion and removal of the pin.

For rotatably supporting bar 22, a block 24 has a threaded stud 26 fixed thereto and extending upwardly therefrom. Bar 24 is adapted for being fixed to upper plate 14 as by welding. Spacer blocks may be inserted between block 24 and plate 14 if necessary. Stud 26 extends loosely through an aperture 28 provided in bar 22 and above the bar is a spring 25 contained between a lower washer 27 resting on top of bar 22 and an upper washer 29 which abuts the underside of a nut 30 threaded on stud 26.

The safety mechanism also includes a bar, or cleat, 32 welded to the underside of bar 22 and adapted to engage a side face of block 24. Thus, when bar 22 is in its FIG. 3 position, bar, or cleat, 32 engages the left-hand face of block 24 and locks plate 22 in position.

However, by lifting plate 22, bar, or cleat, 32 can be lifted above the upper edge of block 24 and bar 22 can then be turned about the axis gf stud 26 to the position in which it is shown in FIG. 2 and which will expose the apertures for insertion or removal of pin 20. Bar 22 can be swung completely around 180° from its FIG. 3 position to an idle position and cleat 32 will engage the righthand face of block 24 and latch the bar 22 in this idle position.

The hitch shown in FIGS. 1 to 3 includes side plates 34 and 36 fixed to plates 14 and 16 and provided with apertures 38 for receiving a pin so that the structure 10 leading to the implement can pivot in the vertical direction.

Vertical pivoting of the implement relative to the tractor draw bar is not always necessary and, when this is not necessary, the upper and lower plates, indicated at 40 and 42 in FIG. 4, can be bolted, as by bolts 46, to hitch frame 48 leading forwardly from the implement or wagon or the like to be drawn. The safety device, consisting of the bar 22 and the parts connected thereto will, in this case, also be welded to the top plate of the hitch structure as illustrated in FIG. 5.

On occasion, the structure leading forwardly from the implement will have a top plate in the form of a channel as indicated at 48 in FIG. 6. This requires that the retaining, or safety, bar 22 be spaced upwardly so that it will clear the flanges at the sides of top plate 48 and this can be accomplished by using one or more spacer blocks 50 between block 24 and top plate 48.

FIG. 6 shows a modification in which the block 24 has the corners beveled as at 52 and this arrangement is of merit in that it assists in camming bar 22 upwardly when it is desired to rotate it out of a latched position.

In all of the modifications described above, a device is provided which can be incorporated in a new hitch structure or which can be mounted on existing hitch structures, thereby to prevent the loose connecting pins which are dropped into the hitch structures from above from working out of the apertures therefor or, in particular, from bouncing out of the apertures while the tractor and implement are in motion. The device is quite reliable in operation and can easily be manipulated even while wearing a glove, and has no small parts to become broken or lost.

Inasmuch as nut 30 is threaded on the upper end of stud 26, it is of the self-locking type, it is a simple matter to screw the nut 30 down on stud 26 to the point that bar 22 is locked in the indexed position it occupies. Thus, with the bar 22 in its FIG. 3 position, pin retaining position, by pulling nut 30 down on stud 26 to the point that bar 22 is locked in place, the towed device can be moved at relatively high speed and along highways and the like without any possibility that the hitch will become disengaged.

Modifications may be made within the scope of the appended claims.

What is claimed is:

1. A device for use with a hitch arrangement in which fixedly interconnected vertically spaced upper and lower plates on a drawn device are adapted to receive a tractor draw bar therebetween while a headed pin loosely inserted into aligned apertures in said plates and draw bar from above connects the draw bar to the plates in draft transmitting relation; said device comprising a base member adapted to be fixed to said upper plate in spaced relation to the said aperture therein, a stud fixed to and upstanding from said base member, a bar having one end apertured to receive said stud and resting on said base member, said bar being rotatable about the axis of said stud, the other end of said bar overlying said apertures in only one rotated position of the bar, a spring engaging said bar from above and urging said bar toward said base member, said base member having at least one side face which is planar and parallel to the axis of said stud and spaced radially from the stud, said bar comprising means forming a substantially planar shoulder thereon on the underneath and facing said stud and parallel to the axis of the stud and substantially the same radial distance from axis of the stud as said one side face of said base member, said shoulder on said bar aligning with said one side face of said base member in said one rotated position of said bar, said shoulder on said bar and said one side face of said base member forming interengageable elements of latch means for retaining said bar in said one rotated position, said elements being disengageable by vertical movement of said bar on said stud against the bias of said spring.

2. A device according to claim 1 in which said base member is a polygonal block having a plurality of side faces at an angle to each other and all parallel to the axis of said stud, said spring surrounding said stud on the side of said bar facing away from said block and urging said bar toward said block.

3. A device according to claim 2 in which said bar has a cleat fixed to the side facing said block and the side of said cleat facing said block forming said shoulder.

4. A device according to claim 2 in which said block has a pair of opposite side faces which are parallel and equal distances from the axis of said stud, said pair of side faces being perpendicular to said bar in said one rotated position thereof, a cleat fixed to the side of said bar which faces said block and the side of said cleat facing said block forming said shoulder, said cleat engaging one of said pair of side faces in said one rotated position of said bar and the other of said pair of side faces when said bar is rotated 180° from the said one rotated position thereof.

5. A device according to claim 2 in which the corners of said block at the top are beveled to faciliate rotation of said bar.

* * * * *